United States Patent

Margala

[15] 3,644,983
[45] Feb. 29, 1972

[54] EASILY SERVICED TELESCOPING CYLINDER

[72] Inventor: Charles E. Margala, 2610 Hubbard Road, Youngstown, Ohio 44505

[22] Filed: Nov. 6, 1969

[21] Appl. No.: 874,438

[52] U.S. Cl..................................29/401, 308/4, 280/106.5
[51] Int. Cl. .....................................B22d 19/10, B23p 7/00
[58] Field of Search..............29/401; 308/4; 280/106.5, 124

[56] References Cited

UNITED STATES PATENTS 3,219,397  11/1965  Heldenbrand..........................29/401
2,298,049  10/1942  Gardner......................................308/4

Primary Examiner—John F. Campbell
Assistant Examiner—Donald P. Rooney
Attorney—Peter L. Klempay

[57] ABSTRACT

A telescoping cylinder in which the annular stops which, in cooperation with the collars on the lower ends of the inner sleeves, limit the upward travel of the inner sleeves are permanently welded to the inner walls of the sleeves. The bottom wall of the cylinder assembly is removable to permit rapid assembly and disassembly of the cylinder, even after the cylinder has been subjected to prolonged and/or extremely heavy service.

4 Claims, 3 Drawing Figures

Patented Feb. 29, 1972
3,644,983
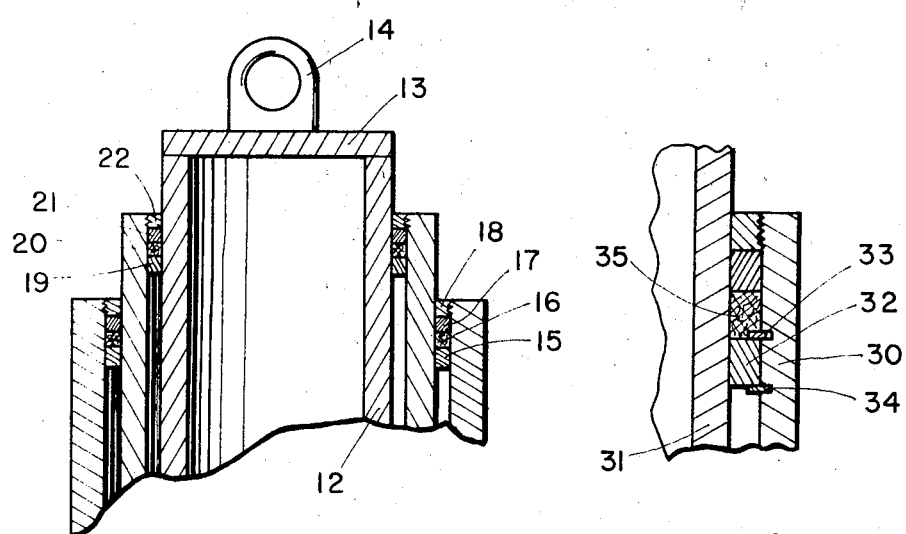
FIG. 2
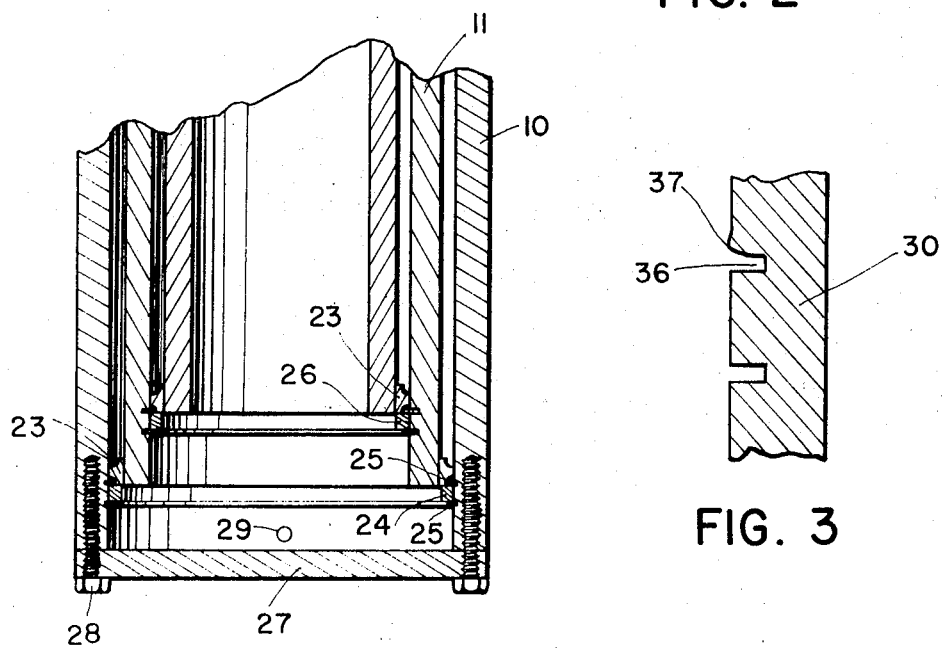
FIG. 1
FIG. 3
INVENTOR.
CHARLES E. MARGALA
BY
Peter L. Klempay
AGENT

EASILY SERVICED TELESCOPING CYLINDER

This invention relates to hydraulic cylinders of the telescoping type and more particularly to an improved construction of the bottom or closed end of a telescoping cylinder.

Each of the sleeves of a telescoping cylinder, except the innermost sleeve, is provided with an annular stop which cooperates with an annular collar on the lower end of the adjacent smaller diameter sleeve to limit the upward movement of the inner sleeve to cause the adjacent sleeve to move upwardly with the inner sleeve. Since the cylinders are provided with welded bottoms, it is necessary to make provisions from the removal of the annular stops so that the cylinder may be disassembled for repairs. To permit such assembly and disassembly of the cylinder the annular stops are retained in place by snap rings received in annular grooves immediately above and below the stop ring. This arrangement, however, is unsatisfactory as all the forces transmitted between the adjacent sleeves are applied to the upper snap ring and are transmitted through the small area of contact between the between the snap ring and the upper sidewall of the snap ring retaining groove. This extremely high concentration of forces over a small area results in the deformation of the inner wall of the sleeve immediately above the snap ring to produce an annular ridge on the inner wall. The presence of this ridge prevents the removal of the annular stops and, consequently, the disassembly of the cylinder for repair. The snap rings are also prone to break and subsequently gouge and scratch the outer walls of the telescoping sleeves. This results in a rapid deterioration of the packing at the upper end of the cylinder and subsequently shortens the useful life thereof. The use of the stop rings threaded to the internal walls of the sleeves has also been proposed. However, under the substantial forces which must be transmitted through the annular stops, the threads retaining the stops tend to be stripped away thus necessitating complete rebuilding of the cylinder.

It is the primary object of the present invention to provide an improved construction of a telescoping cylinder which permits the cylinder to be easily disassembled even after the cylinder has been subjected to substantial periods of use. As will be seen in the following description, this is accomplished by providing a cylinder construction in which the sleeves are readily removed through the lower end of the cylinder.

A further object of the present invention is the provision of a telescoping hydraulic cylinder in which the annular stops are securely retained without the use of snap rings. In accordance with the principles of this invention this is accomplished by permanently welding these stop rings at their desired location on the inner walls of the sleeves, the provisions for withdrawing the sleeves from the lower end of the cylinder eliminating the necessity of having removable upper stops.

It is also an object of the present invention to provide a method for repairing and reconditioning telescoping hydraulic cylinders which permits the disassembly of worn or damaged cylinders without further damage to the components thereof and which produces a rebuilt cylinder which may thereafter be readily disassembled for repair. In accordance with the objects of the present invention this is accomplished by providing a method whereby the telescoping cylinder may be readily disassembled even in the event a ridge has been formed on the sleeve walls and by replacing the removable annular stops with permanently affixed ones.

An additional object of the present invention is a provision of a method for disassemblying and reconditioning telescoping hydraulic cylinders which results in a significant reduction of the time and cost necessary to recondition a worn or damaged telescoping hydraulic cylinder.

Another object of the present invention is the provision of a telescoping hydraulic cylinder which is of simple yet rugged construction and which may be readily disassembled for maintenence or repair.

The above and other objects and advantages of the invention will become apparent upon consideration of the following specification and the accompanying drawing wherein there is shown a preferred embodiment of the invention.

In the drawing:

FIG. 1 is a vertical sectional view of a telescoping hydraulic cylinder constructed in accordance with the principles of the present invention;

FIG. 2 is a fragmentary vertical sectional view of a telescoping hydraulic cylinder constructed in accordance with the principles of the prior art; and FIG. 3 is a fragmentary sectional view, on a greatly enlarged scale, of a portion of one of the sleeves of the cylinder of FIG. 2.

As will be seen in FIG. 1, the telescoping hydraulic cylinder of my invention is provided with an outer hollow cylindrical sleeve 10 and a plurality of additional hollow cylindrical sleeves 11, 12 which are telescopingly received within the outer sleeve 10. The upper end of the innermost sleeve 12 is sealed as shown at 13 and may also be provided with an eye or other suitable fastening means 14 to connect the cylinder to the structure which is to be moved thereby. A steel ring 15 is welded to the inner wall of the outer sleeve 10. The ring 15 is welded adjacent the upper end of the sleeve 10 but at a sufficient distance from the end of the sleeve to permit the insulation of packing material 16, a packing compression ring 17, and a packing gland 18. In like manner, each of the intermediate sleeves 11 has welded to it a ring 19 and is provided with packing 20, a packing compression ring 21, and a packing gland 22. A collar or ring 23 is rigidly secured to the outer cylindrical surface at the lower end of each of the movable sleeves, that is, the intermediate sleeves 11 and the innermost sleeve 12. Adjacent the lower end of the inner wall of the sleeve 10 there is provided a stop ring 24 which may be retained in place by means of upper and lower snap rings 25 received in circumferential grooves in the sleeve wall. Stop rings 26 are likewise provided at the lower end of the inner walls of each of the intermediate sleeves 11. A plate 27 is bolted to the lower end surface of the outer sleeve 10 and forms a fluid tight seal with this sleeve.

In the operation of the cylinder, hydraulic fluid under pressure is supplied through the conduit 29. The hydraulic fluid first forces the innermost sleeve 12 upwardly. The sleeve 12 moves until the collar 23 at its lower end reaches the ring 19 which is welded to the inner surface of the innermost of the intermediate sleeves 11. The two innermost sleeves now continue to move upwardly together until the collar at the lower end of the sleeve 12 reaches the welded stop ring at the upper end of the adjacent sleeve. When pressure is released from the hydraulic fluid and a downward force is applied to the upper end 13 of the sleeve 12, this sleeve moves downwardly until its collar 23 reaches the lower stop ring 26 on the inner surface of the intermediate sleeve 11. Likewise, the intermediate sleeves 11 are returned to their retraced position within the outer sleeve 10.

Reference should now be had to FIG. 2 which illustrates the method of securing the upper snap rings employed in the telescoping cylinders of the prior art. The reference numerals 30 and 31 indicate outer and inner sleeves, respectively, of the telescoping cylinder. The outer sleeve 30 is provided with a upper stop ring 32 retained in position by upper and lower snap rings 33 and 34, respectively. Since these conventional telescoping cylinders are provided with nonremovable bottom plates, this arrangement is necessary in order to permit disassembly of the cylinder for repair. In order to withdraw a sleeve from such a cylinder the packing 35 is first removed, the upper snap ring 33 removed, the upper stop ring 32 withdrawn, and the lower snap ring 34 removed. The inner sleeve 31 may now be withdrawn from the outer sleeve 30. It should be noted, however, that the stop ring 32 is held in place only by means of snap rings 33 and 34 and that, when the inner sleeve 31 is fully extended relative to the outer sleeve 30, all the forces between the lower stop ring of the inner sleeve 31 and the stop ring 32 of the sleeve 30 are borne by the upper snap ring 33. As shown in FIG. 3, the resultant concentration of forces over the very small area of contact between the upper snap ring 33 and its retaining groove 36 results in the deformation of the upper surface of the groove 36 and the production of an annular ridge 37 on the inner wall of the sleeve 30. Once the ridge 37 has been formed the normal disassembly of the cylinder becomes impossible as the stop ring 32 cannot be withdrawn past the ridge 37. In order to repair such a damaged cylinder it is necessary to break up the stop ring 32 in situ. This, however, is a difficult and time-consuming operation since it must be accomplished in the narrow region between the outer and inner sleeves 30 and 31 and must be accomplished in the narrow region between the outer and inner sleeves 30 and 31 and must be accomplished without marring or gouging the outer face of the inner sleeve 31. After disassembly of the damaged cylinder has been accomplished it is necessary to remove the ridge 37 and to build up the inner wall of the sleeve 30 so that the proper contour of the groove 36 may be restored.

The principles of my invention may be readily adapted for the repairing of such damaged telescoping cylinders with a substantial reduction of time and expense and producing a repaired cylinder superior to the original. Thus, a damaged cylinder may be repaired by cutting the bottom plate from the outermost sleeve of the cylinder, withdrawing each of the inner sleeves through the now open bottom. The upper stop ring 32 and its retaining snap rings 33 and 34 are now easily removed and replaced by a stop ring welded to the sleeve wall. The sleeves are now polished to restore a smooth uniform external cylindrical surface and are then reinserted into the outermost sleeve from the lower end thereof. The lower stop rings are now reinstalled. Since these rings are not subjected to the high forces which cause deformation at the upper end of the cylinder they may be held in place by snap rings or, in a heavy-duty installation, may be threaded to the lower portion of the inner wall of the sleeve. The cylinder is now sealed by means of a bolted bottom plate and, with the installation of packing at the upper ends of the sleeves, is fully repaired.

The cylinder construction of the present invention in which the upper stop rings are permanently welded in place and which is assembled and disassembled from the lower end is more durable and more easily repaired then the telescoping cylinders of the prior art as the elimination of the snap rings retaining the upper stop rings eliminates the danger of breakage of one of these rings with the resultant gouging and scoring of the sleeve walls.

I claim:

1. The method of reconditioning a telescoping hydraulic cylinder having annular stop members releasably secured to the inner walls of the sleeves of said cylinder adjacent the upper ends thereof, comprising: removing the bottom plate from said cylinder assembly; withdrawing each of the sleeves of said cylinder assembly through the bottom thereof; removing said annular stops and the stop retaining means from the inner wall of said sleeves; welding an annular ring to the inner wall of each of said sleeves except the innermost; reinserting each of said sleeves in the sleeve of next larger diameter from the lower end thereof; and releasably securing a bottom plate to the lower end of the outermost said sleeves.

2. The method according to claim 1 further including the intermediate step of machining and polishing the outer surface of each of said sleeves to a cylindrical surface of uniform radius after the welding step and prior to the reinsertion of said sleeves into one another.

3. The method according to claim 2 further including the step of installing packing between successive sleeves in the annular regions above said welded annular subsequent to the insertion of said sleeves into one another.

4. The method according to claim 1 wherein said annular ring is welded to said sleeve at the location formerly occupied by said annular stop.

* * * * *